United States Patent

[11] 3,556,299

[72] Inventors James F. Zievers
La Grange;
Henry Schmidt, Jr., Hinsdale, Ill.
[21] Appl. No. 719,154
[22] Filed Apr. 5, 1968
[45] Patented Jan. 19, 1971
[73] Assignee Industrial Filter & Pump Mfg., Co.
Cicero, Ill.
a corporation of Illinois

[54] FLUID DISTRIBUTING CONDUIT FOR PROCESSING APPARATUS
4 Claims, 9 Drawing Figs.
[52] U.S. Cl. .................................................. 210/136,
210/279, 210/489, 210/497.1, 210/499
[51] Int. Cl. .................................................. B01d
23/10, B01d 27/10
[50] Field of Search .................................. 239/145,
518, 524; 137/512.1, 516.16; 210/289, 279, 497,
497.1, 489, 457, 499, 136

[56] References Cited
UNITED STATES PATENTS
881,234  3/1908  Fusch ........................... 137/512.1

| | | | |
|---|---|---|---|
| 1,331,237 | 2/1920 | Burris........................... | 210/489X |
| 2,300,789 | 11/1942 | Kelley........................... | 210/338X |
| 3,253,714 | 5/1966 | Quinlan et al. .............. | 210/497X |
| 3,298,394 | 1/1967 | Chorkey....................... | 137/516.16X |
| 3,391,707 | 7/1968 | Riley et al.................... | 210/289X |
| 3,246,766 | 4/1966 | Pall .............................. | 210/497X |
| 3,268,990 | 8/1966 | Adler ........................... | 210/499X |

Primary Examiner—Samih N. Zaharna
Attorney—Fidler, Bradley, Patnaude and Lazo

ABSTRACT: A fluid distributing conduit for conveying fluid under pressure to materials confined within a process vessel includes a feed pipe having a series of holes and a cylindrical elongated member extending along its outer surface over the holes. A plastic coarse-mesh sleeve surrounds the feed pipe and the elongated member, and a fine-mesh fabric sleeve surrounds the coarse-mesh sleeve, whereby the fluid is evenly distributed from the holes to the materials in the vessel. The elongated member spaces the sleeves from the holes to prevent the sleeves from blocking the holes. An elastic band surrounds the pipe over a larger hole to act as a check valve.

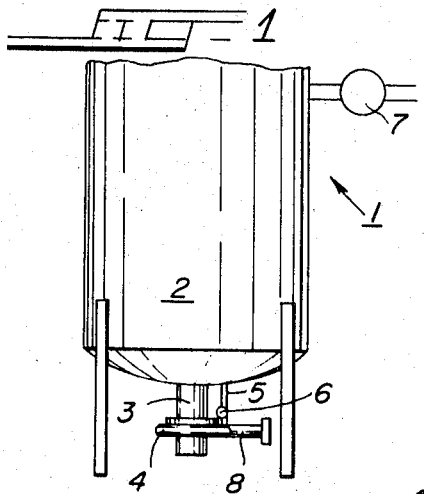
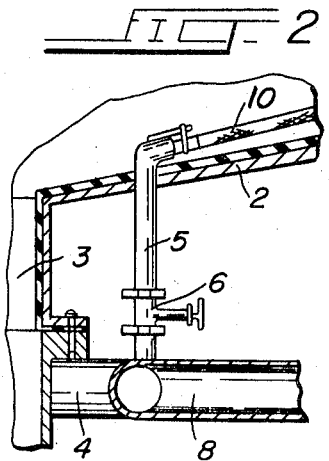
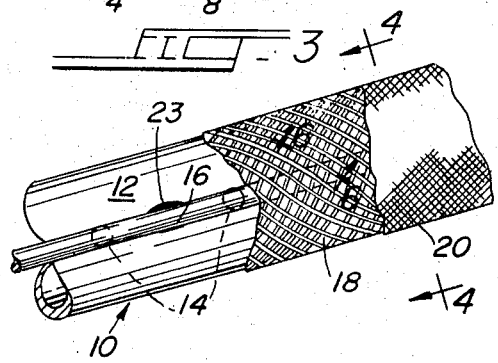
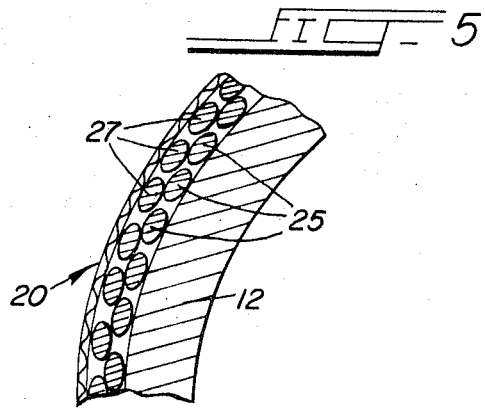
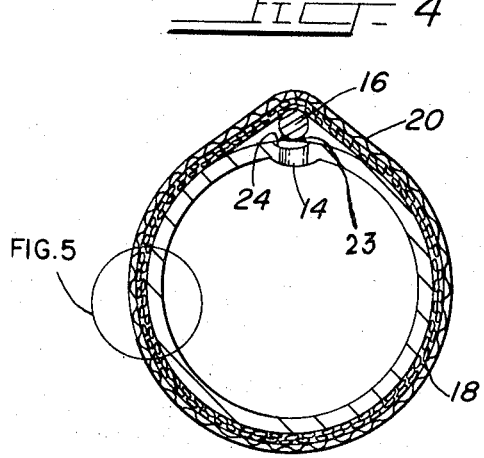
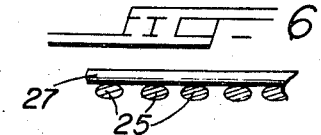
INVENTORS
JAMES F. ZIEVERS
HENRY SCHMIDT, JR.

PATENTED JAN 19 1971
3,556,299
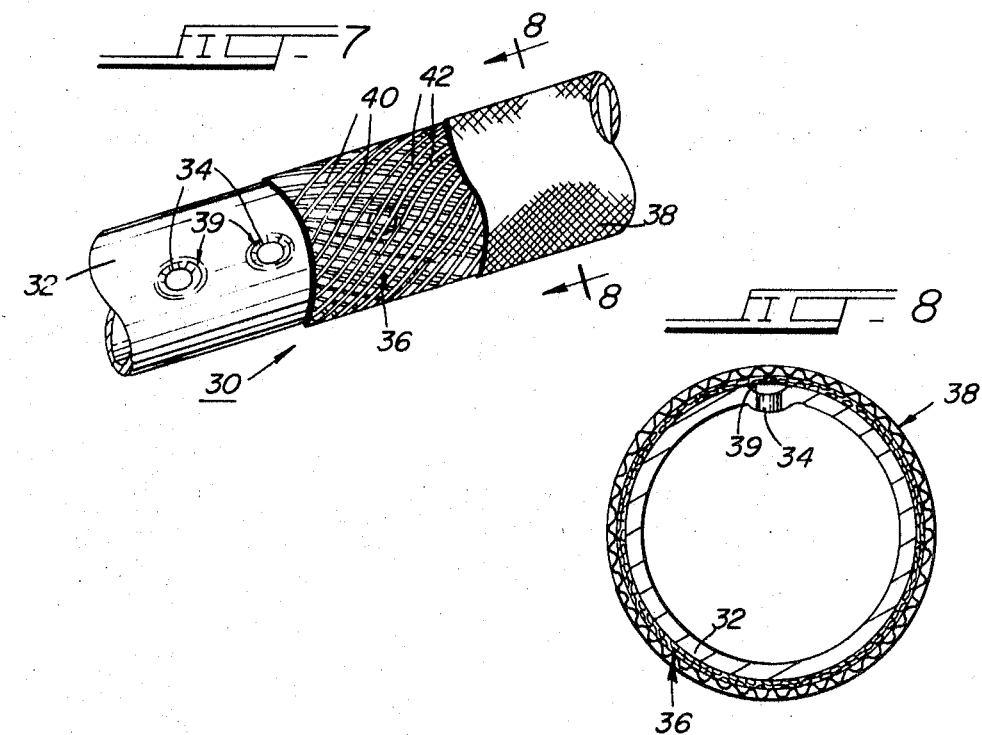
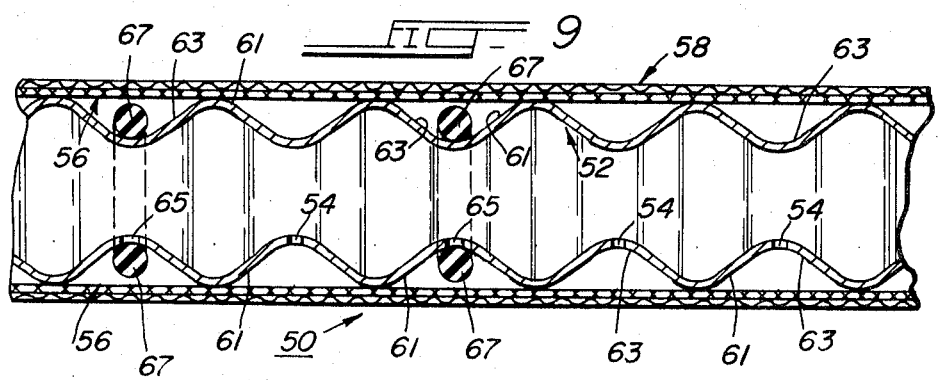
INVENTORS
JAMES F. ZIEVERS
HENRY SCHMIDT, JR 3,556,299

FLUID DISTRIBUTING CONDUIT FOR PROCESSING APPARATUS

BACKGROUND OF THE INVENTION

This invention relates to a fluid distributing conduit for processing apparatus, and it more particularly relates to a conduit adapted to be mounted within a process vessel for distributing fluids under pressure to materials to be processed therein.

Many different types of processing apparatus have been employed for processing different materials, such, for example, as powdered or granulated resinous materials, carbon, and the like materials. According to one successful technique, resin material has been supplied to or emptied from a material feed opening in a material process vessel in accordance with an ion exchange process. The process vessel includes fluid distributing conduits mounted within the vessel for conveying processing fluid under pressure to the resinous material confined within the vessel. Each of the fluid distributing conduits comprises a perforated pipe and a fine-mesh sleeve surrounding the pipe for preventing the resinous material from entering the holes in the pipe and for evenly distributing the fluid flowing from the apertures to the materials to be processed within the vessel. This processing apparatus is disclosed in copending application, Ser. No. 396,840, filed Sept. 16, 1964, entitled "Apparatus and Method for Regenerating Materials," now U.S. Pat. No. 3,391,707. When employing the above-described type of processing apparatus, in some applications, it was discovered that after repeated use the sleeve would block, or at least partially block, some of the apertures in the pipe. As a result, an undue pressure drop in the system resulted and thus the distribution of the fluid would be impaired. Repair or replacement of the impaired fluid distributing conduit would be necessary. Therefore, it would be desirable to have a conduit for evenly distributing the fluid to the material within the process vessel without the difficulty of blocked apertures in the feed pipe.

Furthermore, when using the processing apparatus to regenerate the resinous material, regenerating fluid would be pumped into the process vessel near its top above the material and then flow slowly at a predetermined velocity through the material and out of the vessel via the feed conduits. In order to exactly regulate the velocity of the flow to effectively regenerate the resinous material in the vessel, the exact size of the the apertures in the feed pipe is carefully designed, and hence the apertures are normally relatively small in diameter to cause the regenerating fluid to flow slowly through the resinous material. Thus, in some applications, blockage of the holes by the fine-mesh sleeve caused the exactly predetermined flow velocity to be substantially reduced, whereby the regenerating process was adversely influenced. Moreover, in a regenerating process, before the regenerating fluids enter the vessel, a backwash fluid, such as water, is forced under pressure via the feed conduits to break up and separate the sticky, spent resinous material to permit the regenerating fluid to flow through the material. However, since the feed pipe apertures are relatively small in size, and since a sufficient volume of water under pressure must be quickly sprayed into the spent resinous material to break it apart, in some cases additional feed conduits have been employed and operated only during the backwash operation. Hence, for purposes of the backwash operation, it would be desirable to use only the feed conduits used for the regenerating operation.

SUMMARY OF THE INVENTION

Therefore, it is the principal object of the present invention to provide a new and improved fluid distributing conduit for processing apparatus.

Another object of the present invention is to provide an efficient fluid distributing conduit which includes a perforated feed pipe and means for preventing the apertures in the feed pipe from becoming blocked, or partially blocked, by the outer sleeve.

A further object of the present invention is to provide a fluid distributing conduit which includes a perforated feed pipe having both large holes and small holes to enable a check valve to seal the large holes during the regenerating operation and to controllably open the large holes only during the backwash operation.

Briefly, the above and further objects are realized in accordance with the present invention by providing an elongated member extending along the surface of a perforated feed pipe over the holes therein and disposed between the conduit and the outer fine-mesh sleeve to space the portion of the sleeve adjacent the holes from the surface of the pipe thereby preventing blockage of the holes. In accordance with one form of the invention, the elongated member comprises a metal rod which extends along the outer surface of the pipe over the aligned holes and which is welded to the pipe. In order to assist in preventing blockage of the apertures by the fine-mesh sleeve and to assist in evenly distributing fluid, a coarse-mesh reticulate sleeve surrounds the pipe and the rod and is disposed between the outer fine-mesh sleeve and the feed pipe. In another embodiment of the invention, the cylindrical member comprises one of a plurality of pipe engaging cylindrical bars of a coarse-mesh reticulate sleeve surrounding the feed pipe. The pipe engaging bars are interconnected by a plurality of cross connecting bars to form the reticulate surface of the sleeve. The coarse-mesh sleeve is disposed between the pipe and the outer fine-mesh sleeve to prevent the outer sleeve from blocking the apertures in the pipe and to assist in the even distribution of fluid. In order to utilize the above-mentioned feed conduits during the backwash operation without the necessity of using additional conduits, a resilient band surrounds the pipe and covers a larger hole in the pipe, whereby the band acts as a check valve. During a regenerating process, the regenerating fluid is prevented from entering the feed pipe by the band, and during the backwash operation the backwash fluid under high pressure escapes via the larger hole by forcing the band away from the pipe. When the elastic band check valve is used, the perforated feed pipe comprises a corrugated pipe having holes disposed in the innermost portion of the furrows in the pipe so that the elastic band is properly seated to seal the larger hole and the smaller hole are spaced from the sleeve.

BRIEF DESCRIPTION OF THE DRAWINGS

These and further objects of the present invention will be understood more fully and completely from the following detailed description when considered with reference to the accompanying drawings, wherein:

FIG. 1 is a front elevational view of a processing system incorporating principles of the present invention;

FIG. 2 is an enlarged, vertical cross-sectional view of a lower portion of the processing system of FIG. 1;

FIG. 3 is an isometric view of a portion of a fluid distributing conduit according to the present invention and having portions thereof broken away to disclose the invention;

FIG. 4 is an enlarged, cross-sectional view of FIG. 3 taken substantially along the line 4—4 thereof;

FIG. 5 is an enlarged view of the circled portion of FIG. 4;

FIG. 6 is a cross-sectional view of FIG. 3 taken substantially along the line 6—6 thereof;

FIG. 7 is an isometric view of a portion of another fluid distributing conduit for processing apparatus according to the present invention and having portions thereof broken away to disclose the invention;

FIG. 8 is an enlarged, cross-sectional view of the fluid distributing conduit of FIG. 7 taken substantially along the line 8—8 thereof; and FIG. 9 is a cross-sectional view of still another fluid distributing conduit for processing apparatus according to the present invention.

DESCRIPTION OF THE PREFERRED EMBODIMENTS

Referring to FIGS. 1 and 2, there is shown a processing system 1 which incorporates the principles of the present invention. Since there are many other different types of processing systems which may incorporate the present invention, the processing system disclosed herein is only included by way of example. The system 1 includes a process vessel 2, a material feed pipe 3 communicating with the interior of the vessel 2 at the lowermost area of its dish-shaped bottom wall, and an annular manifold 4 surrounding the pipe 3 and disposed at the bottom of the vessel 2 for conveying processing fluid under pressure to and from the vessel 2 via a connector pipe 5 and a control valve 6. Pumping apparatus 7 is connected in fluid communication with the vessel 2 near its top for pumping treating fluids to the material in the vessel. The vessel 2 can be open to the atmosphere or it can be provided with a cover (not shown) to seal the vessel chamber so that the system 1 can be operated at a pressure which is at or above atmospheric pressure. A two-way pump (not shown) pumps the processing fluid under pressure to and from the manifold 4 via a pipe 8. The connector pipe 5 extends through an opening in the bottom wall of the vessel 2 into the interior thereof and is connected in fluid communication to a fluid distributing conduit 10 extending along the bottom wall of the vessel 2 for distributing the fluid under pressure to the materials to be processed which are confined within the vessel 2. Normally a plurality of connector pipes and fluid distributing conduits are connected in fluid communication to the manifold 4, but, for sake of clarity, only one connector pipe and fluid distributing conduit are shown in the drawings. In operation, the processing system 1 can function in different manners, such as an ion-exchange system for purifying water by filtering it through powdered or granulated resinous materials, or as a regenerating system for the resinous material. The present invention will be described in connection with the system 1 used as a regenerating system; but since the invention can be used in many other types of systems, it should be understood that the invention should not be limited to a regenerating system. When the system 1 is used to regenerate resinous material, the spent resinous material is transferred from an ion-exchange system (not shown) to the sealed vessel 2 via the material feed pipe 3. The first step in the regeneration operation is the backwash operation. In this regard, in order to quickly break apart the sticky resinous material to permit regenerating fluid to flow through the material, after opening the valve 6, a fluid such as water under high pressure is pumped to the material in the vessel 1 via the pipe 8, the manifold 4, the pipes 5, and the feed conduits 10. The water flows upwardly through the material and out of the vessel 2 via an outlet (not shown) or the apparatus 7. Thereafter, the regenerating fluid under pressure enters the vessel 2 via the pumping apparatus 7 above the resinous material in the vessel. The regenerating fluid can then flow downwardly through the resinous material to cause it to be regenerated. The fluid then flows out of the vessel 2 via the feed conduits, the pipes 5, the manifold 4 and the pipe 8. Further details of the system 1 are disclosed in the above-mentioned application, Ser. No. 396,840, filed Sept. 16, 1964, now U.S. Pat. No. 3,391,707.

As shown in FIGS. 3 and 4, the fluid distributing conduit 10 comprises a feed pipe 12 having a series of longitudinally aligned holes 14 therein and having its free end removably plugged, a cylindrical rod 16 fixedly attached to the outer surface of the pipe 12 and extending over the holes 14, a coarse-mesh reticulate sleeve 18 surrounding the pipe 12 and the rod 16, and an outer fine-mesh sleeve 20 surrounding the inner sleeve 18. The metal rod 16 is fixedly attached to the pipe 12 by any convenient means, such, for example, as by the welds 23 located between each of the holes 14. Each of the equally spaced holes 14 has substantially the same diameter as the diameter of the rod 16, and the holes 14 face the bottom of the vessel 2 to help prevent the resinous material from entering the holes 14. In use, fluid under pressure is conveyed to the process vessel by means of the manifold 4 and the conduit 10 so that the fluid is distributed from the holes 14 around the rod 16, through the openings in the coarse-mesh sleeve 18, and thence through the openings in the fine-mesh sleeve 20, whereby the fluid is evenly distributed to the material to be processed within the process vessel.

With reference to FIG. 4, it may be seen that the rod 16 thus provides a baffle for distributing fluid from the holes 14. Moreover, because the rod 16 and the pipe 12 are both cylindrical, the rod 16 does not reduce the effective size of the holes 14. Furthermore, the rod 16 serves as a spacer for the sleeve 18 and prevents the sleeve 18 from blocking, or partially blocking, the holes 14. Each of the holes 14 is located at the innermost portion of a recess or indentation 24 (FIG. 4) to space the hole 14 from the rod 16 so that an adequate space is provided for the fluid to flow from the holes 14 past the rod 16.

In its unstressed condition, the coarse-mesh sleeve 18 is cylindrically shaped and is composed of a plastic material, such, for example, as polyethylene. The sleeve thus comprises a plurality of parallel, spaced-apart bars 25 for engaging the outer surface of the pipe 12 and the rod 16. The bars 25 are interconnected in the form of a mesh or grid by means of a plurality of parallel, spaced-apart cross connecting bars 27 to form a seamless sleeve. As a result, the inner sleeve 18 further aids in the distribution of the fluid and also, together with the rod 16, spaces the outer sleeve 20 from the pipe 12 to prevent the sleeve 20 from blocking the holes 14 in the pipe 12.

As shown in FIG. 6, the pipe engaging bars 25 are generally oval in cross section to provide a generally flat inner pipe engaging surface for the sleeve 18. The coarse-mesh sleeve 18 is relatively rigid and fits snugly about the pipe 12 and the rod 16 but is sufficiently loose fitting to permit it to be easily removed from the pipe 12 for maintenance purposes.

The fine-mesh outer sleeve 20 has a relatively finer mesh than the inner sleeve 18 and may be composed of a textile fabric or a fine-mesh screen. Preferably, the outer sleeve 20 is made of polypropylene monofilament which may be suitably woven into a tubular shape. The outer sleeve 20 fits snugly about the inner sleeve 18, but it is sufficiently loose fitting to permit easy removal thereof for maintenance purposes. The sleeve 20 prevents the granules of resinous material from entering the holes 14 of the pipe 12 and also helps to distribute the fluid flowing from the pipe 12. The sleeve 20 also aids the distribution of the fluid emitted from the pipe 12.

Referring now to FIGS. 7 and 8, there is shown another fluid distributing conduit 30 in accordance with the present invention. The fluid distributing conduit 30 includes as its principal elements a feed pipe or conduit 32 having a series of aligned holes 34, a coarse-mesh sleeve 36 surrounding the pipe 32, and a fine-mesh outer sleeve 38 formed of fabric or other fine-mesh material surrounding the inner sleeve 36. The holes 34 are located at the innermost portion of a recess or indentation 39 in the same manner as the indentation 24 for the above-described holes 14. The fine mesh sleeve 38 is constructed in the same manner and is used for the same purpose as the above-described sleeve 20. The inner sleeve 36 is cylindrically shaped and composed of a plastic material, such a polyethylene. The sleeve 36 comprises a plurality of parallel spaced-apart cylindrical bars 40 for engaging the outer surface of the pipe 32 and a plurality of cross connecting spaced-apart parallel cylindrical bars 42 which interconnect the pipe engaging bars 40 to form a seamless, tubular grid or mesh. Depending upon the relative positions of the sleeve 36 and the holes in the pipe 32, the pipe engaging bars 40 may be located over some of the holes 34. However, since the pipe engaging bars 40 are cylindrical in shape they do not block the holes but serve the same function as the rod 16 of the fluid distributing conduit 10. Hence, they act as baffles for evenly distributing the fluid flowing from the holes 34, and they prevent blockage of the holes 34 by the fabric sleeve 38 by spacing it from the pipe 32. The sleeve 36 is sufficiently loose fitting to permit it to be easily removed from the pipe 32 for maintenance purposes.

Referring now to FIG. 9, there is shown still another fluid distributing conduit 50 in accordance with the present invention. The conduit 50 includes as its principal elements a feed pipe or conduit 52 having aligned holes 54, a coarse-mesh sleeve 56 surrounding the pipe 52, and a fine-mesh outer sleeve 58 formed of fabric or other fine-mesh material surrounding the inner sleeve 56. The pipe 52 is convolute in shape having toroidal-shaped ridges 61 and furrows 63 alternating with one another. The holes 54 are disposed in the innermost portion of the furrows 63 so that the furrows 63 serve the same function as the indentation 39 in the fluid distributor 30. The coarse-mesh, seamless sleeve 56 and the outer sleeve 58, may be identical to and serve the same function as the inner sleeve 36 and the outer sleeve 38, respectively, for the conduit 30.

As shown in FIG. 9, the conduit 50 further includes larger holes 65 in the inner most portion of certain ones of the furrows 63 of the pipe 52 and a resilient band, such as a neoprene O-ring 67, surrounding the pipe 52 over the larger holes 65 and being disposed between the inner sleeve 56 and the pipe 52 at the furrow containing one or more of the larger holes 63, whereby the O-ring 67 serves as a check valve. As shown in FIG. 9 of the drawings, there may be two or more O-rings 67, but it is to be understood that depending upon the particular application, there may be more or less than two O-rings. The O-ring may also be composed of rubber or other similar elastomeric material which does not react with the materials and fluids to be used in the process. In its unstressed condition during the regeneration operation, the O-ring 67 tightly surrounds the pipe 52 to seal the larger holes 65 to cause the regenerating fluid to enter only the smaller holes 54 and is spaced from the adjacent inner surface of the inner sleeve 56. During the backwash operation, the fluid, such as water under pressure, forces the portion of the O-ring 67 adjacent the larger hole 65, to stretch and thereby to move away from the hole 65 in the space between the pipe 52 and the inner surface of the sleeve 56, whereby the water under pressure is emitted from the larger holes 65 in the conduit 50, as well as from the smaller holes 54. Once the water ceases to flow, the O-ring 67 snaps back to its original position in its seat in the furrow 63 over the larger holes 65 to provide a seal for them. The furrow 63 serves as a guide so that the O-ring 67 returns to its original position after each backwash operation. It should be understood that the check valve band 67, can also be used with the above-described conduits 10 and 30 and with other types of feed conduits as well.

In view of the above-described fluid distributing conduit, it should now be apparent that an improved fluid distributing conduit for processing apparatus is provided in accordance with the present invention. The conduit is provided with an elongated member extending along the outer surface of a perforated feed pipe over the apertures therein to prevent an outer fine-mesh sleeve from blocking the apertures. The cylindrical member also aids the distribution of the fluid from the apertures in the pipe. According to one embodiment of the invention, the cylindrical member comprises a rod aligned with the holes in the pipe for spacing the portion of a coarse-mesh reticulate sleeve adjacent the holes from the surface of the pipe to prevent blockage of the apertures of the coarse-mesh sleeve which is disposed between the pipe and the outer fine-mesh sleeve. The inner coarse-mesh sleeve assists in preventing the outer sleeve from blocking the apertures and also assists in distributing the fluid to the material in the process vessel. According to another embodiment of the invention, the cylindrical member comprises one of a series of pipe engaging bars of a coarse-mesh reticulate sleeve. The cylindrical pipe engaging bars separate the outer fine-mesh sleeve from the surface of the pipe to prevent blockage of the apertures in the pipe. The reticulate sleeve has the further function of assisting in the even distribution of fluid. In accordance with another feature of the present inventive feed conduit, an elastic band surrounds the pipe over its larger holes to function as a check valve. During the backwash operation, the band is forced away from the pipe by the fluid under pressure to permit it to flow from the larger hole so that a large quantity of liquid quickly flows into the vessel. During the regenerating operation, the band provides a seal for the larger holes to cause all of the regenerating fluid to flow only into the precisely-designed smaller holes in the feed pipe.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

We claim:

1. A conduit assembly for controlling the transfer of liquid between a processing vessel and an associated system, the vessel containing a comminuted material and said conduit assembly being located in said vessel in contact with said comminuted material, the combination comprising:

an elongated pipe provided therein with a plurality of spaced-apart holes, the spacing of said holes and the cross-sectional area thereof being accurately dimensioned;

a seamless, tubular spacer member disposed directly over said pipe in direct contact therewith and being formed by a first plurality of helical bars engaging said pipe substantially throughout the respective lengths of said bars, and a second plurality of bars interconnecting said first plurality of bars and spaced from said pipe by said first plurality of bars, whereby said first plurality of bars may overlie one or more of said holes;

a sleeve of filtering material enclosing said spacer member to permit the passage of fluid through said spacer while inhibiting the passage of said comminuted material into said pipe; and said pipe being further provided with depressed annular areas surrounding each of said holes and dimensioned to provide circular passageways communicating with said accurately dimensioned holes and to substantially space said first plurality of bars from said accurately dimensioned portions of said holes, thereby to minimize the effect of said first plurality of bars on the flow of fluid through said holes.

2. A fluid distributor and collector assembly for use in a processing vessel for removing fluid at a first rate from said vessel and for feeding fluid to said vessel at a second rate with said second rate substantially exceeding said first rate, said assembly comprising:

a closed end feed pipe having a plurality of apertures therein and a fine-mesh sleeve surrounding the pipe;

said feed pipe having a plurality of annular ridges and annular furrows, said apertures being disposed at the innermost portion of said furrows; and a resilient band disposed between said sleeve and said pipe and surrounding said pipe over at least one of said apertures to block said at least one of said apertures and to move outwardly away from blocking relationship therewith by said processing fluid under pressure to permit said fluid to flow outwardly from said at least one of said apertures the flow of said fluid;

the number of said last mentioned apertures and the area thereof being selected to accommodate said second rate.

3. The combination according to claim 2, further including a coarse-mesh reticulate sleeve surrounding said pipe and said band and being disposed between said band and said fine-mesh sleeve.

4. The combination according to claim 2, wherein the last-mentioned aperture is relatively larger in area than other ones of said apertures.